No. 665,750. Patented Jan. 8, 1901.
W. H. McELREE.
TEDDER ATTACHMENT FOR HARVESTERS.
(Application filed June 22, 1900.)
(No Model.)
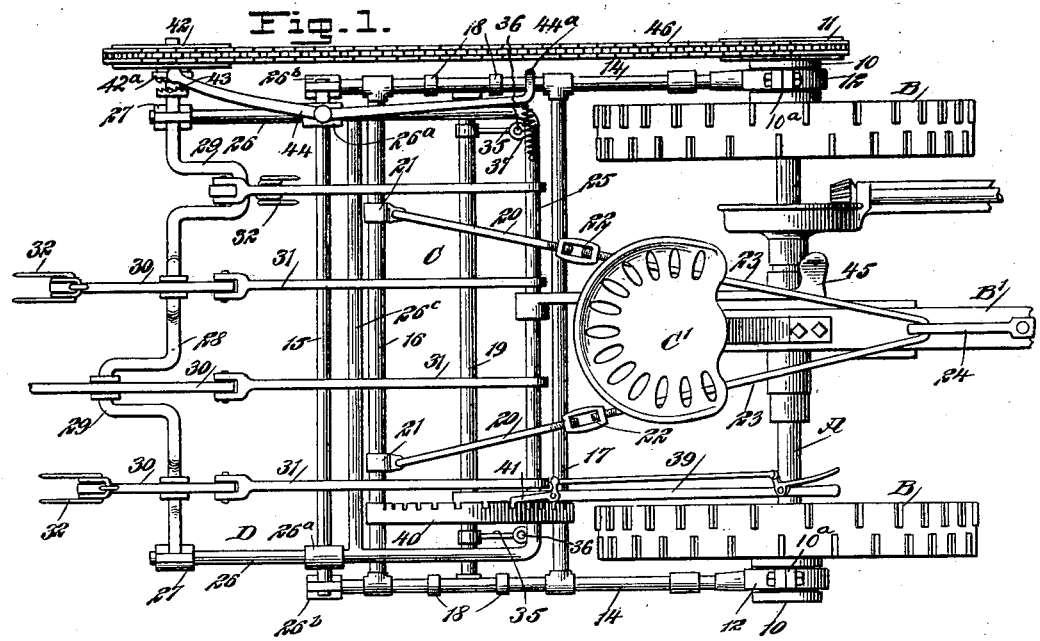
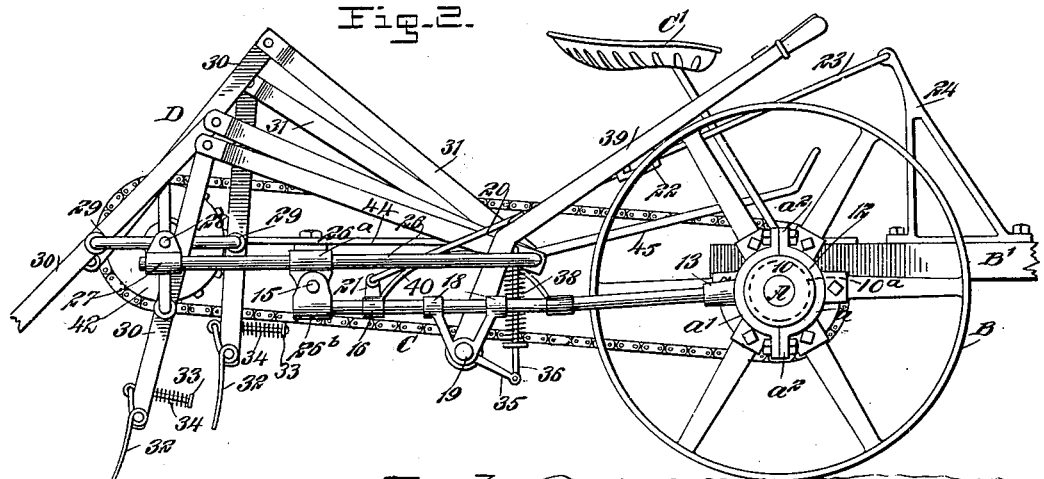
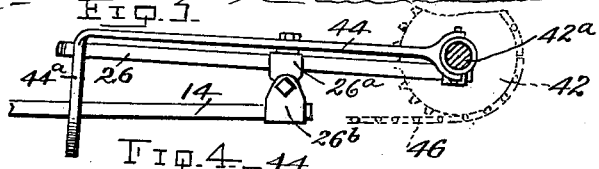
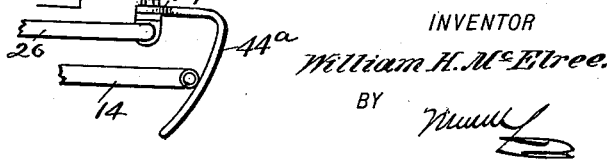
WITNESSES:
INVENTOR
William H. McElree.
BY
ATTORNEYS.

UNITED STATES PATENT OFFICE.

WILLIAM H. McELREE, OF DUNKIRK, OHIO.

TEDDER ATTACHMENT FOR HARVESTERS.

SPECIFICATION forming part of Letters Patent No. 665,750, dated January 8, 1901.

Application filed June 22, 1900. Serial No. 21,178. (No model.)

*To all whom it may concern:*

Be it known that I, WILLIAM H. MCELREE, a citizen of the United States, and a resident of Dunkirk, in the county of Hardin and State of Ohio, have invented a new and Improved Tedder Attachment for Harvesters, of which the following is a full, clear, and exact description.

One purpose of this invention is to provide a tedder attachment capable of being attached to any harvester and readily detached therefrom, the attachment being so made that while the tedder is free to perform all functions of such a machine it in no manner interferes with the action of reaping or mowing or the action of any of the operative parts of a reaper or mower.

Another purpose of the invention is to provide such means of attachment of the tedder to the harvester that the tedder may be quickly and conveniently attached to harvesters or reapers having low or high wheels.

Another purpose of the invention is to provide a construction of tedder wherein the forks can be instantly raised by the driver when an obstruction is met with and dropped to working position when the obstruction has been passed, and, furthermore, to so construct the machine that the fork-carrying frame will be pivoted on the main frame and the main frame will be readily detachable or attachable from or to portions of the structure of a harvester and so that the driver at any time may raise or lower the fork carrying or supporting frame and lock the adjusted frame in its adjusted position, thus regulating the depth to which the tines of the forks shall have action upon the cut grass or grain.

Another purpose of the invention is to provide means for automatically throwing the driving mechanism of the shaft upon which the forks are mounted in and out of gear with the said shaft as the upper or adjustable frame is raised or lowered, the driving mechanism being rendered inactive when the rear end of the upper frame carrying the forks is elevated and brought into action when the rear end of the fork carrying or supporting frame is lowered.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved tedder attachment and a plan view of that portion of a harvester to which the attachment is applied. Fig. 2 is a side elevation of the attachment and that portion of the harvester illustrated in Fig. 1. Figs. 3 and 4 are detail views of the mechanism for throwing the attachment into and out of gear.

A represents the main axle of a harvester, and B the driving or supporting wheels thereof, secured to the axle in the usual manner. The axle in most harvesters usually extends beyond the hubs of the supporting-wheels, and upon the projecting end portions of the axle A boxes or their equivalents are secured, which boxes are in the nature of sleeves, each box having a peripheral groove $10^a$. Preferably the left-hand box 10 is provided with a sprocket-wheel 11 at its outer end. The grooves in the boxes 10 are adapted to receive hangers 12, and, as shown in Fig. 2, these hangers are usually made in two sections $a$ and $a'$, the ends of said sections having outwardly-extending lugs $a^2$, and when the sections $a$ and $a'$ of a hanger are brought together at the curved portion of a box they are connected by bolts or their equivalents passed through the lugs $a^2$. The rear section $a'$ of each hanger is provided with a socket 13.

The main frame C of the tedder attachment may be made of tubular material, if desired, and comprises side bars 14, a rear transverse bar 15, an intermediate cross-bar 16, and a forward cross-bar 17; but the forward ends of the side bars 14 extend beyond the forward cross-bar 17. The forward ends of the side bars 14 when the tedder attachment is applied to a harvester are made to enter the sockets 13 of the hangers 12 and are either attached to the said sockets or are retained therein by frictional contact only. Brackets 18 extend down from the side bars 14 of the main frame C, between the cross-bars 16 and 17, and the ends of a shifting bar 19 are mounted to turn in the said brackets 18, as is shown in Fig. 2.

The main frame C is supported in an adjustable manner preferably through the medium of rods 20, which are attached by clips 21 to the cross-bar 16 of the main frame, and these clips are adjustable upon the said cross-bar and are located one at each side of the center. Turnbuckles 22 are attached to the forward ends of the rods 20, and the ends of a V or U shaped rod 23 are likewise attached to the said turnbuckles, and the bow portion of the rod 23 is pivotally connected with a standard 24, which is mounted on the tongue or pole B' of the harvester or mower in front of the driver's seat C'. Thus it will be observed that by manipulating the turnbuckles 22 the main frame C may be vertically adjusted, so as to accommodate the tedder attachment to harvesters or mowers having driving or supporting wheels of different diameters.

A second frame D is located above the main frame C and consists of a forward cross-bar 25 and rearwardly-extending side bars 26, provided with downwardly-extending clips 26$^a$, pivotally attached to upwardly-extending clips 26$^b$, which are attached to the rear ends of the side bars 14 of the main frame C, so that the upper frame D has a rocking connection with the lower or main frame. The rear cross-bar 15 of the main frame C constitutes the pivotal connection between the clips 26$^a$ and 26$^b$. The upper frame D is strengthened by one or more transverse bars 26$^c$, and at the rear extremity of each side member of the upper frame D a box or bearing 27 is secured, in which boxes or bearings the ends of a crank-shaft 28 are mounted to turn, the crank-shaft having any desired number of crank-arms 29 disposed in various directions, as shown in Fig. 1. A fork-handle 30 is pivoted upon each crank-arm 29, and arms 31 are pivotally attached to the upper ends of the fork-handles 30 and are pivotally mounted on the forward cross-bar 25 of the upper frame D. Each fork-handle 30 is provided at its lower end with a fork 32. These forks are pivotally mounted on their handles and are usually spring-controlled, each fork having an upper bail which extends up at the rear edge of a handle 30, and each of said bails is provided with a pin 33, which extends forwardly through the handle carrying the fork, having a head at its forward end, and a spring 34 encircles each pin, bearing against a handle 30 and the head 33 of the pin; but the construction of the forks, their handles, and the manner in which the handles are attached to the upper frame may be varied.

The upper frame D is controlled mainly by the shifting bar 19, heretofore mentioned as carried by the main frame C. This shifting bar 19 is provided with forwardly-extending crank-arms 35, and rods 36 are pivoted to these crank-arms and extend up through suitable eyes 37, carried by the forward bar 25 of the upper frame D. These eyes 37 may be secured by clips to the frame D, if desired, and a spring 38 is coiled around each rod 36, the said springs having bearing at their bottom portions on flanges or collars formed on the rods 36, while the upper ends of the springs rest against and have bearing on the under surfaces of the eyes 37. When the rear portion of the upper frame D is elevated, these springs 38 are in normal condition and the springs are under tension when the forward portion of the upper frame is brought down to the main frame C. The adjustment of the upper frame D is directly accomplished through the medium of an arm 39, which is usually a crank-arm, and the lower end of this arm is attached to the shifting bar 19, while the forward end of the arm is within convenient reach from the driver's seat C' of the harvester. This arm 39, which may be termed an "adjusting-arm," is provided with a thumb-latch 41, adapted to engage with the toothed surface of a rack 40, carried by the main frame C, as shown in Fig. 1. A driving sprocket-wheel 42 is loosely mounted on and adapted to slide at the left-hand end of the crank-shaft 28, and the hub 42$^a$ of this driving sprocket-wheel is provided with a clutch-surface adapted for engagement with a clutch 43, secured upon the crank-shaft 28. The driving sprocket-wheel 42 is moved to and from the clutch 43 through the medium of a shifting lever 44, mounted upon the upper pivoted frame D, and the forward end of the shifting lever 44 has a downward-curved extension 44$^a$, adapted for engagement with the under face of the left-hand side bar 14 of the main frame C. The arrangement of this shifting lever 44 is such that when the forward end of the upper or pivoted frame D, carrying the forks, is depressed the extension 44$^a$ of the shifting lever will engage with a side bar 14 of the frame C, whereby the lever 44 will be laterally shifted and the driving sprocket-wheel 42 will be carried from engagement with the clutch 43, and hence stop the movement of the crank-shaft 28, and consequently the movement of the crank-handles and the action of the forks. (See Figs. 3 and 4.) The arm 39 is utilized for regulating the position of the upper frame relatively to the lower frame to the extent that the forks will enter the cut grain or grass more or less deeply.

Obstacles are frequently met with in a field which would damage the forks should they come in contact therewith. When such an obstacle is met, the upper pivoted or rocking frame D may be instantly depressed at its forward end and raised at its rear end by attaching a foot-operated arm 45 directly to the forward cross-bar 25 of the rocking frame D, which arm 45 will extend in front of the driver's seat, as shown best in Fig. 1. Motion is communicated from the axle of the harvester or mower to the crank-shaft 28 through the medium of a suitable belt 46, which extends from the sprocket-wheel 11, carried by the harvester, to the sprocket-wheel 42, carried by the crank-shaft 28.

It is obvious that when a tedder attachment is constructed as above set forth it may be attached to any harvester or mower and quickly disconnected therefrom when desired. When the tedder is attached, it is at the rear of the supporting-wheels B and entirely out of the way of the sickle and any operative portion of the harvester. It is furthermore obvious that the attachment of the tedder to the harvester does not interfere in the slightest degree with the levers necessary for operating the harvester and that the levers utilized for controlling the tedder are all so arranged that they do not conflict with the operation of the harvester or the action of its levers.

Having thus described my invention, I claim as new and desire to secure by Letters Patent—

1. In a tedder attachment for harvesters, a main frame having means for attachment to a harvester, a second frame mounted to rock upon the main frame, a lever-arm, a tension-controlled adjusting device for the rocking frame, and suspension-rods provided with turnbuckles attached to the main frame and adapted for attachment to the harvester in connection with which the tedder is employed, as specified.

2. In a tedder attachment for harvesters, a main frame, a frame mounted to rock on the main frame, a crank-shaft carried by the rocking frame, tedder-teeth supported from the crank-shaft, a clutch carried by the crank-shaft, a driving sprocket-wheel loosely mounted on the shaft and arranged for engagement with the clutch, a shifting lever attached to the clutch, having a portion thereof in engagement with the main frame, the said shifting lever being automatically operated in a manner to disengage the clutch from the driving sprocket-wheel when the portion of the rocking frame carrying the crank-shaft is elevated, and adjusting devices for the rocking frame, as set forth.

3. In a tedder attachment for harvesters, a main frame provided with means for attachment to a harvester, a shifting bar carried by the main frame and provided with crank-arms, a second frame mounted to rock on the main frame, pins carried by the crank-arms of the shifting bar and having guided movement in the rocking frame, springs carried by the said pins, adapted to act against the rocking frame, an adjusting-arm attached to the shifting bar, a second arm attached to the forward portion of the rocking frame, and suspension-rods provided with turnbuckles, attached to the main frame and adapted for attachment to the harvester in connection with which the tedder is employed.

4. In a tedder attachment for harvesters, a main frame provided with means for attachment to a harvester, a shifting bar carried by the main frame and provided with crank-arms, a second frame mounted to rock on the main frame, pins carried by the crank-arms of the shifting bar and having guided movement in the rocking frame, springs carried by the said pins, adapted to act against the rocking frame, an adjusting-arm attached to the shifting bar, a second arm attached to the forward portion of the rocking frame, suspension-rods provided with turnbuckles, attached to the main frame and adapted for attachment to the harvester in connection with which the tedder is employed, a crank-shaft carried by the rocking frame, forks provided with supports pivotally connected with the crank-arms of the crank-shaft, and a connection between the supports for the forks and the forward portion of the rocking frame, and a driving mechanism for the crank-shaft, as described.

In testimony whereof I have signed my name to this specification in the presence of two subscribing witnesses.

WILLIAM H. McELREE.

Witnesses:
DAVID F. FRYER,
EARL J. ROBERTSON.